United States Patent
Lindoff (10) Patent No.: US 10,091,792 B2
(45) Date of Patent: Oct. 2, 2018

(54) UE-BASED INTERFERENCE CANCELLATION BY ASSISTING SIGNALING VIA D2D

(71) Applicant: Telefonaktiebolaget L M Ericsson (publ), Stockholm (SE)

(72) Inventor: Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/782,940

(22) PCT Filed: Apr. 8, 2013

(86) PCT No.: PCT/EP2013/057298
§ 371 (c)(1),
(2) Date: Oct. 7, 2015

(87) PCT Pub. No.: WO2014/166516
PCT Pub. Date: Oct. 16, 2014

(65) Prior Publication Data
US 2016/0044686 A1    Feb. 11, 2016

(51) Int. Cl.
*H04W 80/04*    (2009.01)
*H04W 72/08*    (2009.01)
(Continued)

(52) U.S. Cl.
CPC ......... *H04W 72/082* (2013.01); *H04J 11/005* (2013.01); *H04W 8/005* (2013.01);
(Continued)

(58) Field of Classification Search
CPC ..... H04W 80/04; H04W 36/18; H04W 28/04; H04W 72/04
See application file for complete search history.

(56) References Cited

U.S. PATENT DOCUMENTS

2010/0110886 A1    5/2010    Sorri et al.
2010/0255852 A1    10/2010    Chen et al.
(Continued)

FOREIGN PATENT DOCUMENTS

WO    2013007491 A1    1/2013

OTHER PUBLICATIONS

Ahmadi, Sassan, "Interference Cancellation in Cellular Networks", LTE-Advanced, Chapter 12, Coordinated Multipoint Transmission and Reception, Section 12.1, Oct. 10, 2013, 954.
(Continued)

*Primary Examiner* — Andrew Lee
(74) *Attorney, Agent, or Firm* — Murphy, Bilak & Homiller, PLLC (57) ABSTRACT

The present application relates to an advanced receiver capable of subtracting co-channel interference. A significant problem of interference cancellation with this advanced receiver, which is capable to cancel other cell interference, is how to obtain information about the scheduled users, i.e. the interferers in neighboring cell. This knowledge is needed in order to be able to receive the signal from the neighboring cell for further use in the cancellation process. The interference cancellation can by simplified if e.g. the Radio Network Temporary Identifier RNTI and the Physical Cell Identity PCI would be known because the RNTI informs about the scrambling code to use for decoding the control channel, e.g. PDCCH. Thereby, it can be determined whether the data blocks transmitted to the radio devices in the neighboring cells collide with the data blocks transmitted to the advanced receiver. Blind decoding of the PDCCHs transmitted in the neighboring cell is typically not feasible since the device is not aware of which devices are connected to the neighboring cells, making the cancelling process significantly more complex. The problem is solved by the (Continued)

application in that the advanced receiver (2) does a scan for other radio devices (1) in its proximity via a device-to-device D2D link. Once another radio device (1) is detected, the advanced receiver (2) receives (302) information, which allows it to decode the control channel of the neighboring cell to which the other radio device is connected. The advanced receiver can then check whether data blocks of the other cell collide with its own data blocks and to perform suppression of these data blocks.

26 Claims, 5 Drawing Sheets

(51) Int. Cl.
    *H04W 72/04*     (2009.01)
    *H04W 8/00*     (2009.01)
    *H04J 11/00*     (2006.01)
    *H04W 76/14*     (2018.01)
    *H04W 92/18*     (2009.01)
    *H04W 88/06*     (2009.01)

(52) U.S. Cl.
    CPC ....... *H04W 72/0406* (2013.01); *H04W 76/14* (2018.02); *H04W 88/06* (2013.01); *H04W 92/18* (2013.01)

(56) References Cited

U.S. PATENT DOCUMENTS

| | | | | |
|---|---|---|---|---|
| 2010/0323720 A1* | 12/2010 | Jen | .................. | H04B 7/2606 455/456.1 |
| 2012/0015607 A1* | 1/2012 | Koskela | .............. | H04W 76/023 455/62 |
| 2012/0122502 A1 | 5/2012 | Shin et al. | | |
| 2012/0281683 A1 | 11/2012 | Falconetti et al. | | |
| 2013/0003569 A1 | 1/2013 | Lindoff et al. | | |
| 2013/0005269 A1 | 1/2013 | Lindoff et al. | | |
| 2013/0016630 A1* | 1/2013 | Bhushan | ............... | H04W 48/12 370/255 |
| 2013/0077578 A1 | 3/2013 | Wang et al. | | |
| 2013/0148637 A1* | 6/2013 | Yang | ................... | H04W 72/042 370/336 |
| 2014/0003301 A1* | 1/2014 | Madan | ............... | H04W 72/042 370/280 |
| 2015/0029866 A1* | 1/2015 | Liao | ...................... | H04W 4/008 370/241 |
| 2015/0049732 A1* | 2/2015 | Xue | ...................... | H04L 1/1854 370/330 |
| 2015/0110038 A1* | 4/2015 | Yang | ................... | H04W 72/042 370/329 |
| 2015/0230160 A1* | 8/2015 | Lin | ...................... | H04W 48/16 370/252 |
| 2015/0257153 A1* | 9/2015 | Yamazaki | .......... | H04W 72/042 370/329 |
| 2015/0296443 A1* | 10/2015 | Lim | ..................... | H04W 48/12 370/312 |
| 2015/0382390 A1* | 12/2015 | Wong | ................. | H04W 76/023 370/329 |
| 2016/0037322 A1* | 2/2016 | Nguyen | ............... | H04W 8/005 370/329 |
| 2016/0323923 A1* | 11/2016 | Wei | ..................... | H04W 76/023 |

OTHER PUBLICATIONS

Unknown, Author, "Interference cancellation at the UE in Hetnets", Huawei, HiSilicon, 3GPP TSG-RAN WG1 Meeting #72bis, R1-131484, Chicago, USA, Apr. 15-19, 2013, 1-2.

* cited by examiner

UE-BASED INTERFERENCE CANCELLATION BY ASSISTING SIGNALING VIA D2D

TECHNICAL FIELD

The present disclosure relates to methods and devices for downlink (DL) interference cancellation in a radio communication system.

BACKGROUND

Due to the heavy increase of mobile broadband usage all over the world, increased capacity in cellular systems are needed. This can be achieved in several ways. One is by increasing the system bandwidth (BW), another approach is to introduce advanced receivers capable of subtracting co-channel interference (in multiple input, multiple output (MIMO) scenarios for instance). Extended BW is already standardized in the Third Generation Partnership Project (3GPP) with dual carrier/carrier aggregation possibilities. However radio spectrum is a scarce resource and hence in some regions it might not be possible to use carrier aggregation. Therefore advanced receivers including interference cancelling or subtraction techniques are also being standardized in 3GPP and will be of large importance in future cellular communications. In fact, receivers capable of carrier aggregation could utilize the excess processing power for interference cancelling purposes in scenarios where a single carrier is used. Hence advanced receiver capability and dual carrier receivers are linked to each other.

Communication directly between wireless radio devices or terminals, so called Device-to Device (D2D) communication, is also important in future wireless networks. D2D communication is characterized by direct communication between two devices without the need for the data to go via a network node. D2D communication might be done using already existing radio access technologies or techniques, such as Bluetooth, or WLAN/WIFI direct, or it might be done by using future network (NW) assisted D2D communication protocols in Long Term Evolution (LTE) communication standards. NW assisted D2D communication has advantages over non-NW assisted D2D in terms of power consumption and spectrum utilization (the NW node decides when to use cellular or D2D communication).

A device connected to an LTE cell receives control information on the physical downlink control channel (PDCCH). Information which it uses to conclude whether it is scheduled in the downlink in the current sub frame. The device attempts to blindly decode multiple PDCCHs in each sub frame and, if successful, the decoded information contains the parameters necessary to receive the data transmission.

However, a significant problem in the interference cancellation scenario, with i.e. an advanced receiver capable to cancel other cell interference is how to obtain information about the scheduled users (i.e. the interferers in neighbouring cells). This knowledge is needed in order to be able to receive the signal from the neighbouring cell for further use in the cancellation process. Blind decoding of the PDCCHs transmitted in the neighbouring cell is typically not feasible since the device is not aware of which devices are connected to the neighbouring cells, making the cancelling process significantly more complex.

Therefore there is a need for method and apparatus facilitating the blind decoding of a control channel in the mobile device in order to enable the device to do advance interference cancelling of signals transmitted from neighbouring cells to neighbouring mobile devices.

Figure 1:
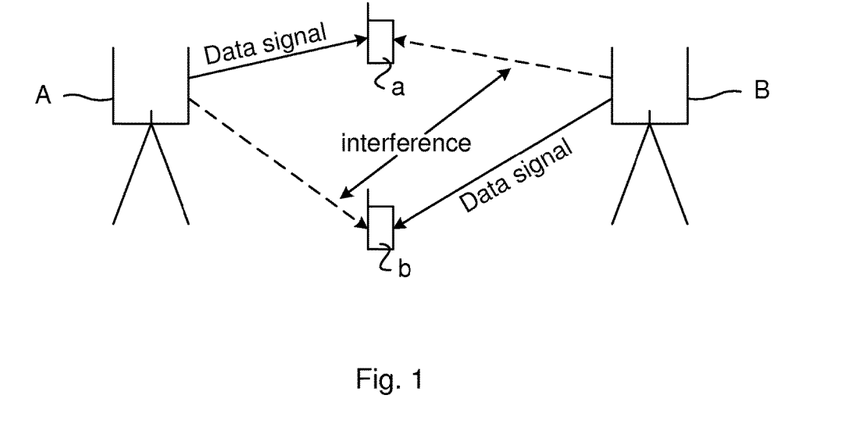
FIG. 1 is a schematic block diagram of a radio communication system according to prior art.

FIG. 1 schematically illustrates a prior art scenario. A radio device a is connected to NW node A and a radio device b, which is in proximity to the device a, is connected to NW node B. Both NW nodes A and B use the same carrier frequency (as indicated by the solid arrows for data signal transmissions). Since the devices are close to each other, the signal from NW node B to device b interferes with the reception by device a of the signal from NW node A and vice versa (dashed arrows are indicating the interference). If the device a can receive/detect the device b signal, it is possible for device a to subtract or suppress that interfering signal and improve the signal to interference ratio (SIR) of the wanted received signal from node A. The problem here is that device a needs to be able to detect the interference. The more information received about the interference, the easier the suppression/cancellation is. Several blind detection techniques are known in the art.

WO2013/007491 discloses a method for providing co-channel interference information by a network node by receiving information for at least one user equipment (UE) connected to an adjacent network node, determining a co-channel interference list for user equipment (UE) connected to the network node wherein the co-channel interference list is based on the received information and transmitting the co-channel interference list to a UE connected to the network node. This solution requires fast information exchanges between the network nodes and the information needs to be broadcast (or unicast) from the network node to the UE, which requires spectral resources.

SUMMARY

It is an objective of the present disclosure to alleviate the problems of the prior art discussed above.

According to an aspect of the present disclosure, there is provided a method in a first radio device, said radio device, during use of the first radio device, being connected to a first remote node via a first radio access technology (RAT). The method comprises obtaining decoding information relating to decoding of a data signal received from the first remote node. The method also comprises transmitting the obtained decoding information, via radio resources assigned for device-to-device (D2D) transmissions.

According to another aspect of the present disclosure, there is provided a first radio device configured to be connected to a first remote node via a first RAT. The first radio device comprises processor circuitry configured to obtain decoding information relating to decoding of a data signal received from the first remote node. The first radio device also comprises transmitter circuitry configured to transmit the obtained decoding information, via radio resources assigned for D2D transmissions.

By transmitting the decoding information via D2D transmissions, a neighbouring radio device can be informed about how to decode and thus better cancel interfering radio signals, while not requiring use of spectrum recourses for signalling via the network.

According to another aspect of the present disclosure, there is provided a method in a second radio device, said second radio device, during use of the second radio device, being connected to a second remote node via a first RAT. The method comprises receiving a radio signal comprising a desired data signal from the second remote node and interference from a first remote node. The method also comprises receiving a D2D transmission from a first radio device connected to the first remote node via the first RAT. The D2D transmission comprises decoding information relating to decoding of a data signal intended for the first radio device in communication with the first remote node. The method further comprises cancelling interference from the radio signal, based on the received decoding information relating to decoding of the data signal intended for the first radio device, said interference being related to said data signal intended for the first radio device.

According to another aspect of the present disclosure, there is provided a second radio device configured to be connected to a second remote node via a first RAT. The second radio device comprises receiver circuitry configured to receive a radio signal comprising a desired data signal from the second remote node and interference from a first remote node. The second radio device also comprises receiver circuitry configured to receive a D2D transmission from a first radio device connected to the first remote node via the first RAT. The D2D transmission comprises decoding information relating to decoding of a data signal intended for the first radio device in communication with the first remote node. The second radio device also comprises processor circuitry configured to cancel interference from the radio signal, based on the received decoding information relating to decoding of the data signal intended for the first radio device, said interference being related to said data signal intended for the first radio device.

By receiving decoding information via D2D transmission, an interfered radio device can be informed about how to decode, and thus better cancel, interfering radio signals intended for a neighbouring radio device, while not requiring use of spectrum recourses for signalling via the network.

According to another aspect of the present disclosure, there is provided a computer program product comprising a computer-executable program for causing a radio device to perform an embodiment of a method of the present disclosure when the computer-executable program is run on a processor comprised in the radio device.

It is advantageous to transfer decoding information between two neighbouring radio devices by means of D2D transmissions, since this can free uplink (UL) and downlink (DL) resources for other network signalling in the radio communication system, in turn increasing the system capacity and the data throughput. By means of the decoding information, interference cancellation in the radio devices can be facilitated and improved.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown.

However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 2:
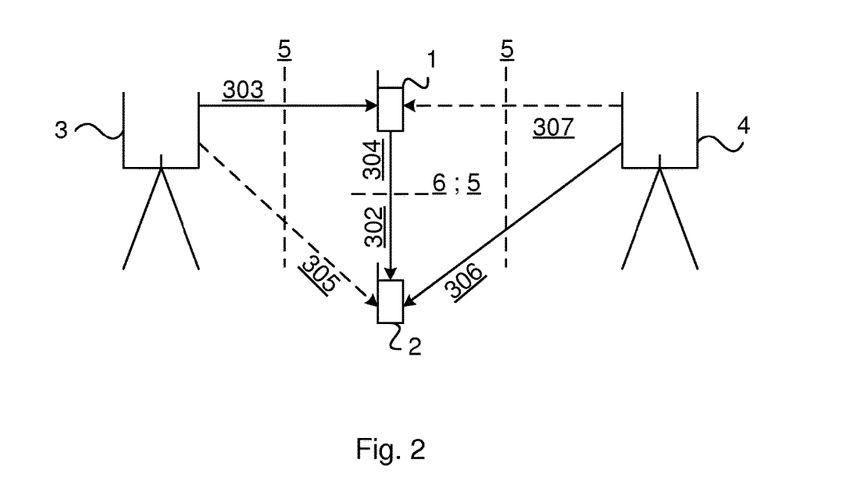
FIG. 2 is a schematic block diagram of a radio communication system in accordance with an embodiment of the present disclosure.

FIG. 2 is a schematic block diagram of a radio communication system in accordance with an embodiment of the present disclosure. A first network node or remote node 3 and a second network node or remote node are provided in the vicinity of each other such that their respective DL transmissions risk of interfering with each other. The network nodes are e.g. node Bs (NB) or evolved NBs (eNB) or other base stations in a wireless communication network. A first radio device 1 is, during use of the first radio device, connected to the first remote node 3 via a first radio access technology (RAT) 5, such as a cellular RAT e.g. in accordance with WCDMA/HSPA or LTE. A second radio device 2 is, during use of the second radio device, connected to the second remote node 4 via the same first RAT 5 as to which the first radio device 1 is connected. DL radio signals 303 (indicated by solid arrow) transmitted from the first remote node 3 to the first radio device 1 result in interference 305 (indicated by dashed arrow) to the second radio device 2. Similarly, DL radio signals 306 (indicated by solid arrow) transmitted from the second remote node 4 to the second radio device 2 result in interference 307 (indicated by dashed arrow) to the first radio device 2. This interference 305 and 307 arises since the two neighbouring remote nodes 3 and 4 use the same radio spectrum. In accordance with the present disclosure, the first radio device 1 is able to transmit a D2D message 302 to the second radio device 2, and the second radio device 2 is able to receive such a D2D message 302. The D2D transmission 302 can be communicated via the same RAT 5 as the cellular communication with the remote nodes 3 and 4, e.g. in NW assisted D2D communication in LTE. Alternatively, it can be advantageous to transmit and receive the D2D message 302 via a second RAT 6, e.g. Bluetooth or WiFi Direct, different than the first RAT 5, to not limit the radio resources or capacity available for the cellular communication. The D2D message 302 can include the decoding information 304 discussed herein.

The first radio device 1 may e.g., via a D2D link, broadcast decoding information 304 related to the cellular link between the first remote/NW node 3 and the first radio device 1. The second radio device 2 then scans the D2D link for obtaining and detection of such decoding information messages and then utilizes that information in the decoding and cancelling/suppression operation of the interference 305. The interference 305 originating from the communication from the first remote/NW node 3 to the first radio device 1 would, if not being suppressed, affect the cellular communication link between the second remote/NW node 4 and the second radio device 2.

The radio device 1 and/or 2 may be any device, mobile or stationary, enabled to communicate over a radio cannel in a communications network, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or personal computer (PC). In 3GPP standards, the radio device is often called a user equipment (UE).

In some embodiments, the obtained decoding information 304 comprises at least one of a cell identity, such as a Global Cell Identity (GCI) or a Physical Cell Identity (PCI) of the first remote node, a Radio Network Temporary Identifier (RNTI) a carrier frequency, a frequency block, a code rate, a modulation or a transmission mode, of the data signal received from the first remote node. These are examples of information which may aid a radio device in receiving and subsequently cancelling interfering radio signals.

In some embodiments, transmitting the obtained decoding information 304 comprises transmitting a broadcast D2D signal. Thus, the first radio device 1 may not be aware of neighbouring radio device(s) to transmit the decoding information. In some embodiments, the broadcast D2D signal comprises a beacon signal having a signature which is associated with the decoding information. In other embodiments the obtained decoding information is transmitted from the first radio device to the neighbouring radio device via an established D2D link.

In some embodiments, transmitting the obtained decoding information 304 comprises transmitting the obtained decoding information via a second RAT 6, different from the first RAT 5. In some embodiments, the second RAT is one of a Wireless Local Area Network, WLAN; Wi-Fi Direct or Bluetooth RAT.

In some embodiments, transmitting the obtained decoding information 304 comprises transmitting the obtained decoding information via the first RAT 5. The radio device may be less complex if the same RAT is used for both D2D and e.g. cellular communication.

In some embodiments, the first remote node 3 is a network node of a cellular communication network.

In some embodiments, obtaining the decoding information 304 comprises receiving a decoding information message from the first remote node 3; and the obtained decoding information is obtained at least partly from said decoding information message.

In some embodiments, the first RAT 5 is one of a Long Term Evolution (LTE) or High Speed Packet Access (HSPA) RAT.

Figure 3:
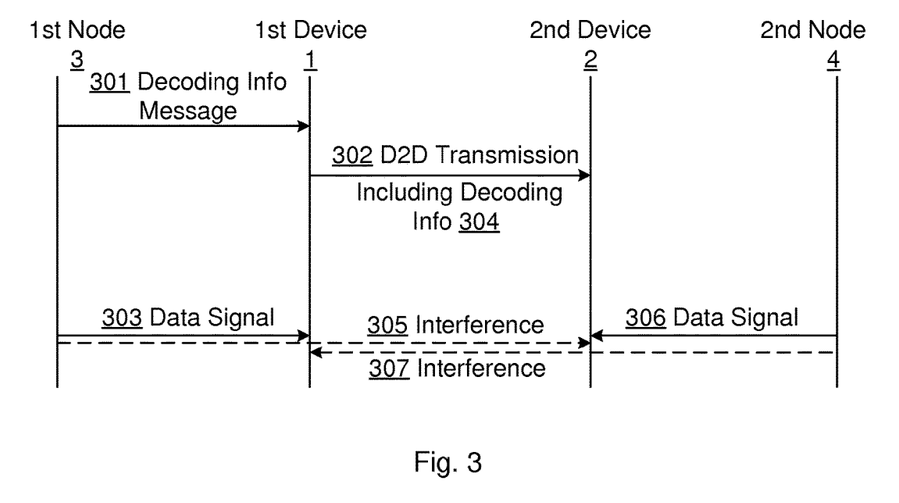
FIG. 3 is a schematic signalling diagram in accordance with an embodiment of the present disclosure.

FIG. 3 is a schematic signalling diagram in accordance with an embodiment of the present disclosure. The first radio device 1 receives a decoding information message 301 from the first remote node 2. This may be regular information which a remote node sends to its connected devices in order to enable said devices to receive signalling from said node, e.g. GCI, RNTI, PCI etc. The first radio device 1 then sends, e.g. broadcasts, the decoding information 304 via a D2D transmission 302. This decoding information may be the same as received in the decoding information message from the first remote node, or the first radio device may have processed it before transmitting it using D2D resources. The second radio device 2 receives the D2D transmission 302 including the decoding information 304. A data signal 303 is transmitted from the first remote node 3 to the first radio device 1, and another data signal 306 is sent from the second remote node 4 to the second radio device 2. These data signals 306 and 303 cause respective interferences 305 and 307 at the first and second radio devices 1 and 2.

Figure 4:
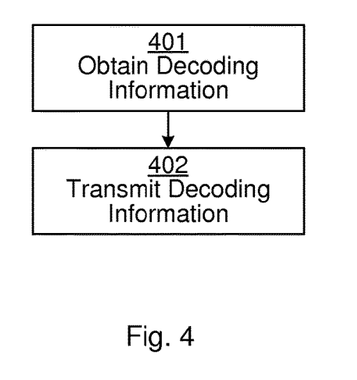
FIG. 4 is a schematic flow chart of an embodiment of a method of the present disclosure.

FIG. 4 is a flow chart illustrating an embodiment of a method performed by the first radio device 1 of the present disclosure. The first radio device 1 obtains 401 the decoding information 304 relating to decoding of the data signal 303 received from the first remote node 3. At least parts of the decoding information may e.g. be obtained in a conventional way from the first remote node 3 to which the first radio device is connected. Other parts of the decoding information may be obtained by the first radio device itself. For instance, RNTI and data rate may be transmitted from the first remote node 3, and the information regarding carrier frequency, GCI and PCI may be determined by the first radio device itself, via e.g. a cell search procedure. Then, the obtained decoding information is transmitted 402, via radio resources assigned for device-to-device (D2D) transmissions 302. The decoding information may e.g. be transmitted by broadcasting D2D information, or transmitted to a neighbouring second radio device 2 via a D2D communication link set up between the two radio devices 1 and 2 once the second device 2 has detected the D2D beacon signal from the radio device 1.

Figure 5:
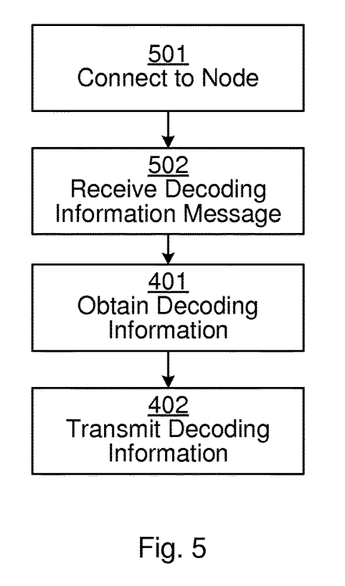
FIG. 5 is a schematic flow chart of another embodiment of a method of the present disclosure.

FIG. 5 is a flow chart illustrating another embodiment of a method performed by the first radio device 1 of the present disclosure. The first radio device 1 connects 501 to a first remote node 3, e.g. in a conventional manner. A decoding information message 301 from the first remote node 3 is received 502. From this decoding information message 301, the first radio device 1 obtains 401 the decoding information. The first radio device 1 then transmits 402 the obtained decoding information via radio resources assigned for device-to-device (D2D) transmission 302, in analogy with the discussion relating to FIG. 4.

Figure 6:
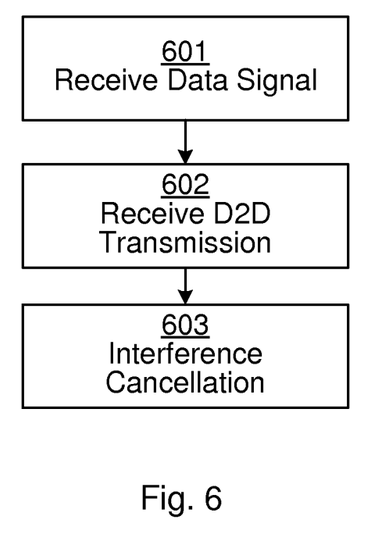
FIG. 6 is a schematic flow chart of another embodiment of a method of the present disclosure.

FIG. 6 is a flow chart illustrating an embodiment of a method performed by the second radio device 2 of the present disclosure. A radio signal comprising a desired data signal 306 from the second remote node 4 and interference 305 from a first remote node 3; 4 are received 601 at the second radio device 2. It is noted that the first remote node may typically be a neighbouring remote node 3 to which the second radio device is not connected. However, in some embodiments, the first remote node may be the same node as the second remote node 4 to which the second radio device 2 is connected. The second radio device 2 may thus experience interference from the node it is connected to, when said node 4 also transmits radio signals intended for another radio device, e.g. the first radio device 1 discussed herein. A D2D transmission 302 is received 602 from a first radio device 1 via a D2D link. The first radio device 1 is connected to the first remote node 3 via the first RAT 5. The D2D transmission 302 comprises decoding information 304 relating to decoding of a data signal 303 intended for the first radio device 1 in communication with the first remote node 3. Thus, the second radio device 2 obtains information for receiving/decoding a potentially interfering data signal which is intended for the first radio device 1 but not for the second radio device 2. Interference 305 from the radio signal 303 is cancelled 603, based on the received decoding information 304 which is relating to decoding of the data signal 303 intended for the first radio device 1. The interference 305 at the second radio device is related to said data signal 303 intended for the first radio device 1. The second radio device thus cancels interference resulting from a data signal intended for the first radio device 1 by means of the decoding information received from the D2D transmission.

Figure 7:
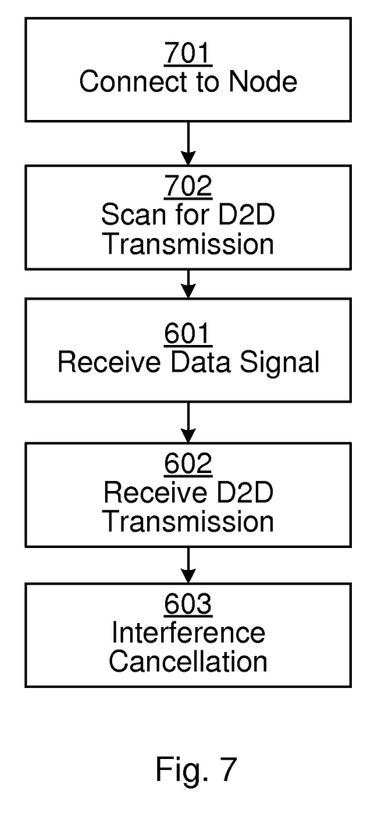
FIG. 7 is a schematic flow chart of another embodiment of a method of the present disclosure.

FIG. 7 is a flow chart illustrating another embodiment of a method performed by the second radio device 2 of the present disclosure. The second radio device 2 connects 701 to a second remote node 4, e.g. in a conventional manner. The second radio device 2 also scans 702 for D2D transmissions. The second radio device 2 thus does not need to know of the existence of any neighbouring radio device, but routinely scans 702 for any D2D transmission from such a neighbouring radio device 1. If a D2D transmission comprising decoding information 304 is received 602, then this information may be used for interference cancellation 603 of a received data signal as received in step 601, as discussed herein and in relation to FIG. 6. If no such D2D transmission is received as a result of the scanning 702, the second radio device 2 will possibly use conventional methods for cancelling interference, or will probably not be able to perform any interference cancelling at all.

It is noted that the second radio device 2 may receive 602 a plurality of D2D transmissions from a plurality of different neighbouring/first radio devices 1. Decoding information 304 from these D2D messages 302 may be used to cancel 603 the interference from a plurality of radio signals 303 from a plurality of remote nodes 3 and/or 4.

Example 1

Examples of the decoding information include GCI and/or PCI (i.e. cell identity, cell ID). Cell ID has typically been detected by the first radio device 1 in a cell search step where the device 1 has searched for potential cells to connect to and camp/be served on (known in the art). The GCI might however have been determined by reading a broadcast channel or have been received from dedicated signalling from the remote node. Also, RNTIs (Radio Network Temporary Identifier) associated with the connection between the first radio device 1 and the first remote node 3 have been determined, typically via signalling from the remote node 3, but may also be determined from the PCI/GCI, possibly in combination with the identity of the first radio device (IMSI). The RNTIs then gives an indication of which scrambling code to use when searching for and decoding of the control channels (PDCCH in LTE). The RNTIs could be several, depending of data information type, for instance related to UL/DL data blocks allocated to one device or common (for several devices) data blocks allocated to several devices etc. The RNTI and PCI are parameters/information that the second radio device 2 may need to know for simplifying interference cancellation 603 as described above. The PCI information gives information about which cell the first radio device 1 is connected to. The second radio device 2, has determined, from the cell search step, neighbouring strong cells and does regular signal measurements on these cells, mainly for handover purposes. Information about PCI for the first radio device as well as carrier frequency used for the cell give an indication of whether this first radio device 1 is a potential candidate for generating interference in the DL connection from the first remote node 3 to the first radio device 1 on the DL connection from the second remote node 4 to the second radio device 2. The RNTIs then give information about which scrambling code to use for decoding of the control channel, e. g. PDCCH. This information can be used to determine whether the data blocks transmitted to the first radio device 1 (on the data channel, physical downlink shared channel, PDSCH, in LTE) collides with the data blocks (resource blocks in LTE) transmitted to the second radio device 2, and hence will need to be decoded and cancelled 603 (or suppressed).

Also other types of decoding information may be possible to determine for the first radio device 1. For instance, carrier frequency, specific frequency block within a system BW where the first radio device 1 will be allocated data, code rates, transmission mode or modulation used etc.

Example 2

The first radio device 1 compiles the decoding information and transmits 402 (broadcast) this information on the D2D link, hence the obtained decoding information is transmitted as a broadcast D2D signal 302. Different approaches may be envisioned. For instance, the decoding information 304 can be attached as an information packet to a beacon signal. The beacon signal (synchronization signal) is transmitted in order for other radio devices 2 to be able to find the first radio device 1. In another embodiment, the information 304 can be incorporated in the beacon signal itself, e.g. the beacon signal has a signature which is associated with the decoding information, or the signal pattern is a function of the decoding information 304. In yet another embodiment, the information 304 is sent to a second radio device 2 after an initial pairing of the devices has been made (i.e. a second radio device 2 has detected the beacon signal and transmits a response, and a connection between the devices have been set up). The D2D link may use the same carrier frequency as the cellular link, however certain resource blocks or time instances are allocated to the D2D link and some other are allocated to the cellular link. In this case, the cellular link and the D2D link use the same RAT 5. Alternatively, the D2D link is transmitted on another carrier frequency or frequency band, and in that case either the same RAT 5 as the cellular link may be used or another RAT 6 (WIFI direct or Bluetooth for instance).

Example 3

A second radio device 2 is connected 701 to a serving cell (a second remote node 4, which typically is a cellular NW node). Hence, the second radio device 2 is known at the network node and could be in active or passive communication with the second remote node 4. The second radio device 2 does a scan 702 for other radio devices 1 in the proximity of the second device 2 via a D2D link. The scanning procedure is similar to the cellular cell search step and is made according to principles and procedures depending on the current D2D protocol (i.e. according to prior art techniques). Once a first radio device 1 is detected, the second radio device 2 receives 602 the decoding information 304. The second radio device 2 then determines whether the decoding information is relevant (for instance by checking that the first radio device 1 is connected to a first remote node 3 that could be a potential interferer for the DL between the second remote node 4 and the second radio device 2). If that is the case, the second radio device 2 then stores the decoding information 304 and utilizes that information to enhance the decoding performance of the cellular link. For instance, the decoding information 304 may be used for decoding the control channel, e.g. PDCCH on of the first remote node 3 to which the first radio device 1 is connected. The second radio device 2 checks whether data blocks associated with the first radio device collide with data block received from the second remote node 4. If that is the case, interference cancelling 603 or interference suppression of these data blocks is performed.

The example has assumed a second radio device 2 cancelling 603 interference being associated with a first radio device 1. However, the present disclosure also covers the case of several first/interfering radio devices 1. Hence, the interfered, second, radio device 2 may have determined several first radio devices 1 and received the decoding information 304 from each of these devices 1 and utilize all this decoding information to cancel 603 the interference generated by all (or a subset) of the first radio devices 1.

Figure 8:
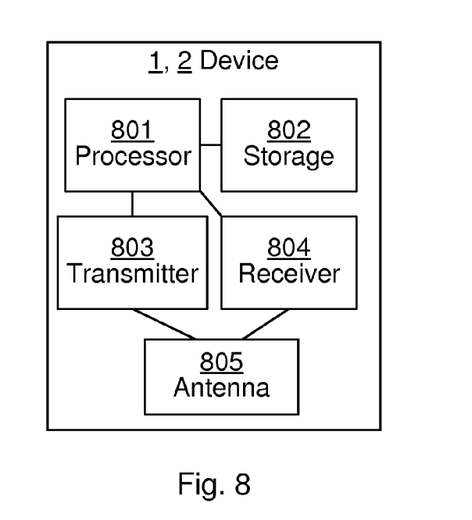
FIG. 8 is a schematic block diagram of an embodiment of a radio device of the present disclosure.

FIG. 8 schematically illustrates an embodiment of a radio device 1 or 2 of the present disclosure configured to perform the respective processing as described above. The radio device 1 or 2 comprises a processor circuit 801 e.g. a central processing unit (CPU). The processor circuit 801 may comprise one or a plurality of processing units in the form of microprocessor(s). However, other suitable devices with computing capabilities could be comprised in the processor circuits 801, e.g. an application specific integrated circuit (ASIC), a field programmable gate array (FPGA) or a complex programmable logic device (CPLD). The processor circuit 801 is configured to run one or several computer program(s) or software stored in a storage unit 802 e.g. a memory. The storage unit is regarded as a computer readable means and may e.g. be in the form of a Random Access Memory (RAM), a Flash memory or other solid state memory, or a hard disk. The processor circuit 801 is also configured to store data in the storage unit 802, as needed. The radio device 1 or 2 also comprises an antenna 805, a transmitter 803, a receiver 804, which may be combined to form a transceiver or be present as distinct units within the radio device 1 or 2. The transmitter 803 is configured to cooperate with the processor circuit 801 to transform data bits to be transmitted over a radio interface to a suitable radio signal in accordance with the radio access technology (RAT) used by the Radio Access Network (RAN) via which the data bits are to be transmitted. The receiver 804 is configured to cooperate with the processor circuit 801 to transform a received radio signal to received data bits. The antenna 805 may comprise a single antenna or a plurality of antennas, e.g. for different frequencies and/or for MIMO (Multiple Input Multiple Output) communication. The antenna 805 is used by the transmitter 803 and the receiver 804 for transmitting and receiving, respectively, radio signals. In some embodiments, notably when the D2D transmission is via the same RAT as the transmissions to the remote node 3 or 4, the transmitter 803 and the receiver 804, in cooperation with the antenna 805, are used also for D2D transmissions.

Figure 9:
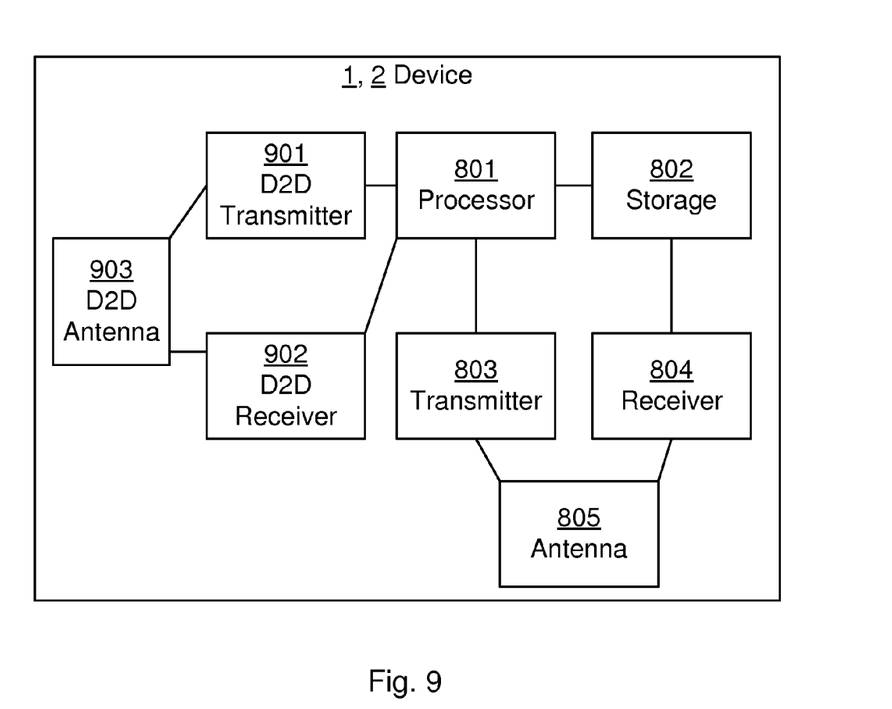
FIG. 9 is a schematic block diagram of another embodiment of a radio device of the present disclosure.

FIG. 9 schematically illustrates another embodiment of a radio device 1 or 2 configured to perform the respective processing as described above of the present disclosure. The radio device of this embodiment comprises the same parts as the embodiment of FIG. 8, and reference is made to the discussion of that figure. In addition to the transmitter 803 and the receiver 804, in cooperation with the antenna 805, the embodiment of FIG. 9 also comprises a D2D transmitter 901 and a D2D receiver 902, in cooperation with a D2D antenna 903, for transmitting and receiving, respectively, D2D transmissions. The use of such a second radio interface especially for D2D communication, may be suitable for the embodiments of the present disclosure where the D2D transmissions is via a second RAT, different than the first RAT which is used for transmissions to the remote node 3 or 4.

Figure 10:
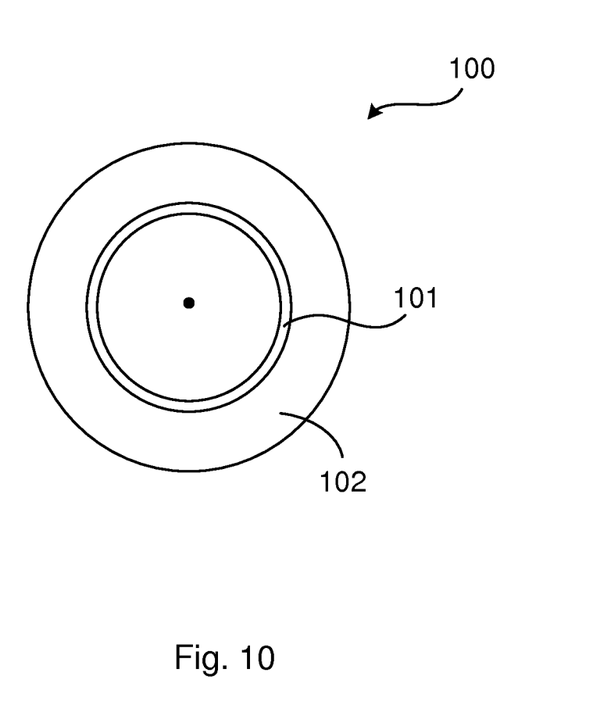
FIG. 10 is a schematic illustration of an embodiment of a computer program product of the present disclosure.

FIG. 10 illustrates an embodiment of a computer program product 100. The computer program product 100 comprises a computer readable medium 102 comprising a computer program 101 in the form of computer-executable components 101. The computer program/computer-executable components 101 may be configured to cause a radio device 1 and/or 2, e.g. as discussed above, to perform the embodiments of a method of the present disclosure. The computer program/computer-executable components may be run on the processing circuit 801 of the radio device for causing the device to perform the method. The computer program product 100 may e.g. be comprised in a storage unit or memory 802 comprised in the radio device 1 or 2 and associated with the processing unit 801. Alternatively, the computer program product 100 may be, or be part of, a separate, e.g. mobile, storage means, such as a computer readable disc, e.g. CD or DVD or hard disc/drive, or a solid state storage medium, e.g. a RAM or Flash memory.

Below follow some other aspects and embodiments of the present disclosure.

In some embodiments, the second remote node (4) and the first remote node (3) are different. However, in some other embodiments the second remote node (4) is the same node as the first remote node (3).

In some embodiments, the received (701) transmission is a broadcast D2D transmission (302). In some embodiments, the received (701) decoding information is associated with a beacon signal comprised in the broadcast D2D transmission (302).

According to an aspect of the present disclosure, there is provided a computer program (101) for a first radio device (1), said radio device being configured for being connected to a first remote node (3) via a first RAT (5), the computer program comprising computer program code (101) which is able to, when run on a processor (801) of the radio device (1), cause the radio device to: obtain (401) decoding information (304) relating to decoding of a data signal (303) received from the first remote node (3); and transmit (402) the obtained decoding information, via radio resources assigned for D2D transmissions (302). According to another aspect of the present disclosure, there is provided a computer program product (100) comprising such a computer program (101) and a computer readable means (102) on which the computer program is stored.

According to another aspect of the present disclosure, there is provided a computer program (101) for a second radio device (2), said second radio device being configured for being connected to a second remote node (3; 4) via a first RAT (5), the computer program comprising computer program code (101) which is able to, when run on a processor (801) of the second radio device (2), cause the second radio device to: receive (601) a radio signal comprising a desired data signal (306) from the second remote node (4) and interference from a first remote node (3; 4); receive (602) a D2D transmission (302) from a first radio device (1) connected to the first remote node (3; 4) via the first RAT (5), the D2D transmission (302) comprising decoding information (304) relating to decoding of a data signal (303) intended for the first radio device (1) in communication with the first remote node (3); and cancelling interference (603) from the radio signal (306), based on the received decoding information (304) relating to decoding of the data signal (303) intended for the first radio device (1), said interference being related to said data signal (303) intended for the first radio device (1). According to another aspect of the present disclosure, there is provided a computer program product (100) comprising such a computer program (101) and a computer readable means (102) on which the computer program is stored.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method in a first radio device, said first radio device, during use of the first radio device, being connected to a first remote node via a first radio access technology (RAT), the method comprising:
    obtaining decoding information relating to decoding of a data signal received from the first remote node; and
    transmitting the obtained decoding information, via radio resources assigned for device-to-device (D2D) transmissions.

2. The method of claim 1, wherein the obtained decoding information comprises at least one of a cell identity, such as a Global Cell Identity (GCI) or a Physical Cell Identity (PCI) of the first remote node; a Radio Network Temporary Identifier (RNTI), a carrier frequency, a frequency block, a code rate, a modulation or a transmission mode, of the data signal received from the first remote node.

3. The method of claim 1, wherein transmitting the obtained decoding information comprises transmitting a broadcast D2D signal.

4. The method of claim 3, wherein the broadcast D2D signal comprises a beacon signal having a signature which is associated with the decoding information.

5. The method of claim 1, wherein transmitting the obtained decoding information comprises transmitting the obtained decoding information via a second RAT, different from the first RAT.

6. The method of claim 5, wherein the second RAT is one of a Wireless Local Area Network (WLAN), Wi-Fi Direct, or Bluetooth RAT.

7. The method of claim 1, wherein transmitting the obtained decoding information comprises transmitting the obtained decoding information via the first RAT.

8. The method of claim 1, wherein transmitting the obtained decoding information comprises transmitting the obtained decoding information to a second radio device.

9. The method of claim 1, wherein the first remote node is a network node of a cellular communication network.

10. The method of claim 1, wherein:
    obtaining the decoding information comprises receiving a decoding information message from the first remote node; and
    at least part of the obtained decoding information is obtained from said decoding information message.

11. The method of claim 1, wherein the first RAT is one of a Long Term Evolution (LTE) or High Speed Packet Access (HSPA) RAT.

12. A method in a second radio device, said radio device, during use of the second radio device, being connected to a second remote node via a first radio access technology (RAT) the method comprising:
    receiving a radio signal comprising a desired data signal from the second remote node and interference from a first remote node;
    receiving a device-to-device (D2D) transmission from a first radio device connected to the first remote node via the first RAT, the D2D transmission comprising decoding information relating to decoding of a data signal intended for the first radio device in communication with the first remote node; and
    cancelling interference from the radio signal, based on the received decoding information relating to decoding of the data signal intended for the first radio device, said interference being related to said data signal intended for the first radio device.

13. The method of claim 12, wherein the decoding information comprises at least one of a cell identity, such as a Global Cell Identity (GCI) or a Physical Cell Identity (PCI) of the first remote node; a Radio Network Temporary Identifier (RNTI), a carrier frequency, a frequency block, a code rate, a modulation or a transmission mode, of the data signal intended for the first radio device.

14. The method of claim 12, wherein the received D2D transmission is received via a second RAT, different from the first RAT.

15. The method of claim 14, wherein the second RAT is one of a Wireless Local Area Network (WLAN), Wi-Fi Direct, or Bluetooth RAT.

16. The method of claim 12, wherein the received D2D transmission is received via the first RAT.

17. The method of claim 12, wherein the second remote node is a network node of a cellular communication network.

18. The method of claim 12, wherein the first RAT is one of a Long Term Evolution (LTE) or High Speed Packet Access (HSPA) RAT.

19. A first radio device configured to be connected to a first remote node via a first radio access technology (RAT) the first radio device comprising:
    processor circuitry configured to obtain decoding information relating to decoding of a data signal received from the first remote node; and
    transmitter circuitry configured to transmit the obtained decoding information, via radio resources assigned for device-to-device (D2D) transmissions.

20. The radio device of claim 19, further comprising:
    receiver circuitry configured to receive a decoding information message from the first remote node;
    wherein the processor circuitry is configured to obtain at least part of the decoding information from said decoding information message.

21. The radio device of claim 19, wherein the obtained decoding information comprises at least one of a cell identity, such as a Global Cell Identity (GCI) or a Physical Cell Identity (PCI) of the first remote node; a Radio Network Temporary Identifier (RNTI), a carrier frequency, a frequency block, a code rate, a modulation, or a transmission mode, of the data signal received from the first remote node.

22. The radio device of claim 19, wherein transmitter circuitry is configured to transmit the obtained decoding information via the first RAT.

23. The radio device of claim 19, wherein transmitter circuitry is configured to transmit the obtained decoding information via a second RAT, different from the first RAT.

24. A second radio device configured to be connected to a second remote node via a first radio access technology (RAT) the second radio device comprising:

receiver circuitry configured to receive a radio signal comprising a desired data signal from the second remote node and interference from a first remote node;

receiver circuitry configured to receive a device-to-device (D2D) transmission from a first radio device connected to the first remote node via the first RAT, the D2D transmission comprising decoding information relating to decoding of a data signal intended for the first radio device in communication with the first remote node; and processor circuitry configured to cancel interference from the radio signal, based on the received decoding information relating to decoding of the data signal intended for the first radio device, said interference being related to said data signal intended for the first radio device.

25. The radio device of claim 24, wherein the decoding information comprises at least one of a cell identity, such as a Global Cell Identity (GCI) or a Physical Cell Identity (PCI) of the first remote node; a Radio Network Temporary Identifier (RNTI), a carrier frequency, a frequency block, a code rate, a modulation, or a transmission mode, of the data signal intended for the first radio device.

26. A non-transitory computer-readable medium comprising, stored thereupon, a computer-executable program configured to cause a radio device connected to a first remote node via a first radio access technology (RAT) to, when the computer-executable program is run on a processor comprised in the radio device:

obtain decoding information relating to decoding of a data signal received from the first remote node; and transmit the obtained decoding information, via radio resources assigned for device-to-device (D2D) transmissions.

* * * * *